US008056412B2

(12) United States Patent
Rutkiewicz et al.

(10) Patent No.: US 8,056,412 B2
(45) Date of Patent: Nov. 15, 2011

(54) INERTIAL MEASUREMENT UNIT AND METHOD OF CONSTRUCTING THE SAME USING TWO ORTHOGONAL SURFACES

(75) Inventors: Robert D. Rutkiewicz, Edina, MN (US); Robert W. Stuelke, Minneapolis, MN (US); Todd A. Ell, Savage, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 625 days.

(21) Appl. No.: 12/208,106

(22) Filed: Sep. 10, 2008

(65) Prior Publication Data

US 2010/0058860 A1  Mar. 11, 2010

(51) Int. Cl.
*G01P 1/02*  (2006.01)
(52) U.S. Cl. ............................................ 73/493; 73/510
(58) Field of Classification Search ............... 73/493, 73/504.12, 510, 514.01
See application file for complete search history.

(56) References Cited

U.S. PATENT DOCUMENTS

| 4,084,774 | A | * | 4/1978 | Kimberley | ................. 244/194 |
| 4,179,818 | A | | 12/1979 | Craig | |
| 4,711,125 | A | | 12/1987 | Morrison | |
| 5,635,639 | A | * | 6/1997 | Greiff et al. | ................. 73/504.04 |
| 6,115,261 | A | | 9/2000 | Platt et al. | |
| 6,412,346 | B2 | | 7/2002 | Barkai et al. | |
| 6,718,280 | B2 | | 4/2004 | Hermann et al. | |
| 6,859,751 | B2 | | 2/2005 | Cardarelli | |
| 7,143,648 | B2 | | 12/2006 | Pristup et al. | |
| 7,253,079 | B2 | | 8/2007 | Hanson et al. | |
| 2008/0092643 | A1 | * | 4/2008 | Jones | ................. 73/152.58 |

FOREIGN PATENT DOCUMENTS

WO  WO-2006/043046  4/2006

* cited by examiner

*Primary Examiner* — John Chapman, Jr.
(74) *Attorney, Agent, or Firm* — Scott D. Wofsy; Edwards Wildman Palmer LLP (57) ABSTRACT

A method of mounting in-plane sensors of an inertial measurement unit. The method includes the steps of: providing a structure having first and second planar surfaces oriented orthogonally to one another, positioning a plurality of sensors on the first planar surface such that each of the sensors has a sense axis extending parallel to the first planar surface, positioning at least one other sensor on the second planar surface such that the at lease one other sensor has a sense axis extending parallel to the second planar surface, and orienting the sensors on the first and second surfaces so that the angles formed between any two sense axes are equal.

12 Claims, 6 Drawing Sheets

INERTIAL MEASUREMENT UNIT AND METHOD OF CONSTRUCTING THE SAME USING TWO ORTHOGONAL SURFACES

BACKGROUND OF THE INVENTION

1. Field of the Invention

The present invention relates to systems and methods of mounting in-plane sensors, and more particularly to systems and methods of mounting in-plane sensors on two orthogonal surfaces to form a three-axis inertial measurement unit having tetrahedral angle redundancy.

2. Description of Related Art

Inertial measurement units (IMU) are known in the art and have been used in a wide variety of applications. For example, IMUs are commonly used in inertial guidance and navigation systems for all types of vehicles, in particular aircraft and spacecraft. Inertial navigation has the advantage of not being dependent on an external point of reference. Navigation is accomplished by sensing the motion of the vehicle and calculating the change in position with respect to an initial position. The IMU is able to determine the three-dimensional orientation of a body relative to a reference direction absolutely within an inertial system.

A typical IMU may consist of three equal modules, each including a gyroscopic rotational rate sensor, a linear accelerometer, and associated electronics. Each module is typically oriented on a cube or a similar structure to provide inertial measurements along one of three orthogonal axes, with the gyroscopic rotational rate sensors providing information regarding rotation of the unit and the accelerometers providing information concerning linear movement of the unit. In this way, the IMU is able to determine the position of the vehicle with respect to the vehicle's initial position to aid in guidance, navigation, and control of the vehicle.

Three-axis inertial measurement units as described above have been used extensively in aerospace applications. Traditionally, such IMUs included mechanical sensors such as conventional spinning mass gyroscopes and large mechanical accelerometers. However, most current IMUs utilize microelectromechanical systems (MEMS) devices. Many MEMS sensors are mounted on a support substrate made of silicon or a similar material and can detect acceleration by measuring a change in capacitance. Current technologies using MEMS devices encapsulate the accelerometer, gyroscope, and associated electronics into individual packages. These packages are typically soldered to a circuit board, which is then mounted on one plane of an orthogonal assembly, such as a face of a cube.

Most inertial sensors, including MEMS sensors, are perpendicular sensors or out of plane devices, meaning that the sense axis of the device is oriented at a 90 degree angle with respect to the mounting plane. Some MEMS devices, including accelerometers and gyroscopes, are in-plane sensors. In-plane sensors are inertial sensors having a sense axis that is parallel to the mounting plane. In-plane sensors detect an acceleration or rotation along an axis parallel to the surface of the support substrate.

Redundant systems of out of plane sensors arranged along non-orthogonal axes are well known in the art. Redundant inertial measurement systems allow for the failure of one or more sensors while still maintaining the ability to determine the essential location of a vehicle in inertial space. Prior art systems have utilized a variety of structures for mounting out of plane sensors to produce redundant systems. For example, out of plane sensors have been placed on the orthogonal faces of a cube, on the faces of a pyramid or wedge, on the faces of a dodecahedron, and on a tetrahedral structure.

A tetrahedral structure is particularly advantageous for redundant systems. In this configuration, four out of plane sensors are mounted to the four faces of an equilateral tetrahedron, with each of the sensors located symmetrically with respect to the others at an angle of approximately 109.4 degrees between the sense axes of the sensors. This configuration simplifies the equations and resultant equipment necessary to isolate failed sensors and convert output signals from the sensors to a coordinate system fixed in inertial space.

Although a tetrahedral structure is advantageous for redundant inertial measurement units, such a shape adds complexity to the inertial measurement unit and thus increases costs of manufacturing the unit. Accordingly, there is a need in the art for an inertial measurement unit that can provide the advantages of a tetrahedral configuration without the added complexity required by such a configuration.

SUMMARY OF THE INVENTION

Advantages of the present invention will be set forth in and become apparent from the description that follows. Additional advantages of the invention will be realized and attained by the systems and methods particularly pointed out in the written description and claims, as well as from the appended drawings.

In-plane sensors provide a degree of freedom in the angle in which the sensors are mounted on a substrate surface. Two sensors can be mounted on the same planar surface with the sense axis of each sensor pointed in two unique directions to provide sensing along two different axes. By contrast, rotating an out of plane sensor on its mounting plane will not change the orientation of the sense axis. Placing two in-plane sensors on the same surface provides the tetrahedral angles for redundant sensing without the requirement of four unique mounting planes, as in prior art designs. In-plane sensors placed on two orthogonal planes can also be used to sense along three orthogonal axes, removing the need for three unique planes. Prior art designs, which use out of plane sensors, require a separate mounting plane for each sense axis. The present invention provides the redundant sensing using only two planar surfaces.

To achieve these and other advantages and in accordance with the purpose of the invention, as embodied herein, a method of mounting in-plane sensors is disclosed. The method includes the following steps: providing a structure having first and second planar surfaces oriented orthogonally to one another, positioning a plurality of sensors on the first planar surface such that each of the sensors has a sense axis extending parallel to the first planar surface, positioning at least one other sensor on the second planar surface such that the at lease one other sensor has a sense axis extending parallel to the second planar surface, and orienting the sensors on the first and second surfaces so that the angles formed between any two sense axes are equal.

An inertial measurement unit is also disclosed. The inertial measurement unit includes a structure having a first planar surface and a second planar surface oriented orthogonally to one another, two or more primary sensors mounted on the first planar surface, and at least one primary sensor mounted on the second planar surface. Each of the primary sensors mounted on the first planar surface has a sense axis that extends parallel to the first planar surface, and the at least one primary sensor mounted on the second planar surface has a sense axis that is parallel to the second planar surface. The angles formed between any two sense axes of the primary sensors on either the first planar surface or the second planar surface are equal.

A method for providing a tetrahedral angle configuration with sensor redundancy on two mounting surfaces is also provided. The method includes the steps of: providing a structure having a first planar surface and a second planar surface oriented orthogonally to one another, with a linear junction formed at the intersection of the first and second planar surfaces; mounting a first sensor on the first planar surface such that a sense axis of the first sensor is parallel to the first planar surface and oriented at an inner angle of approximately 54.74 degrees from the linear junction; mounting a second sensor on the first planar surface such that a sense axis of the second sensor is parallel to the first planar surface and oriented at an inner angle of approximately 54.74 degrees from the linear junction and 70.53 degrees from sense axis of the first sensor; mounting a third sensor on the second planar surface such that a sense axis of the third sensor is parallel to the second planar surface and is oriented at an inner angle of approximately 54.74 degrees from the linear junction; and mounting a fourth sensor on the second planar surface such that a sense axis of the fourth sensor is parallel to the second planar surface and is oriented at an inner angle of approximately 54.74 degrees from the linear junction and 70.53 degrees from the sense axis of the third sensor.

It is to be understood by those having ordinary skill in the art that the foregoing general description and the following detailed description are exemplary and are intended to provide further explanation of the invention claimed. The accompanying drawings, which are incorporated in and constitute part of this specification, are included to illustrate and provide a further understanding of the method and system of the invention. Together with the description, the drawings serve to explain principles of the invention.

BRIEF DESCRIPTION OF THE DRAWINGS

So that those skilled in the art to which the subject invention pertains will readily understand how to make and use the inertial measurement unit disclosed herein without undue experimentation, preferred embodiments thereof will be described in detail below with reference to the following figures.

DETAILED DESCRIPTION OF THE PREFERRED EMBODIMENTS

The subject invention provides a method of mounting in-plane sensors on non-parallel planar surfaces to provide the full three-axis coverage required for an inertial measurement unit. In a first exemplary embodiment, four in-plane sensors are mounted on two non-parallel surfaces in a tetrahedral configuration to provide three-axis redundant coverage; the fourth sensor provides enhanced reliability and fault detection. In a second exemplary embodiment, six in-plane sensors are mounted on three non-parallel surfaces to provide a six-axis redundant configuration. In a third exemplary embodiment, three in-plane sensors are mounted on two non-parallel planar surfaces to provide a three axis orthogonal alignment of three planar sensors.

A tetrahedral configuration has been recognized as an ideal configuration for mounting in-plane sensors for redundant three axis coverage. In a tetrahedral configuration, each of four sensors is typically oriented perpendicular to a different one of the four faces of an equilateral tetrahedron. In this configuration, all of the sensor are equiangular, that is, the sense axis of each sensor is oriented at an outer angle of 109.47 degrees and an inner angle of 70.53 with respect to the sense axis of every other sensor. This configuration is advantageous because it provides equal redundancy of the sensors in all directions.

Typically, a tetrahedral mounting surface is required for a tetrahedral sensor configuration. However, for in-plane sensors, the inventors have determined that a tetrahedral configuration for the sensors can be achieved using only two mounting planes having a 90° dihedral angle. Using two planes oriented at 90° with respect to one another advantageously allows the same two planar surface to be used for either the non-redundant orthogonal alignment of three in-plane sensors, or for creation of the tetrahedral angle between four in-plane sensors.

With this background, reference will now be made in detail to the present preferred embodiments of the inertial measurement unit, examples of which are illustrated in the accompanying drawings. In each of the side views shown in the drawings, sensors of the inertial measurement unit that are not on the plane perpendicular to the line of sight have been omitted for simplicity. Any reference to an angle in the specification or claims that includes the qualifier "approximately" encompasses an angle within ±1 degree of the stated angle, and preferably within ±0.5 degrees of the stated angle.

Figure 1:
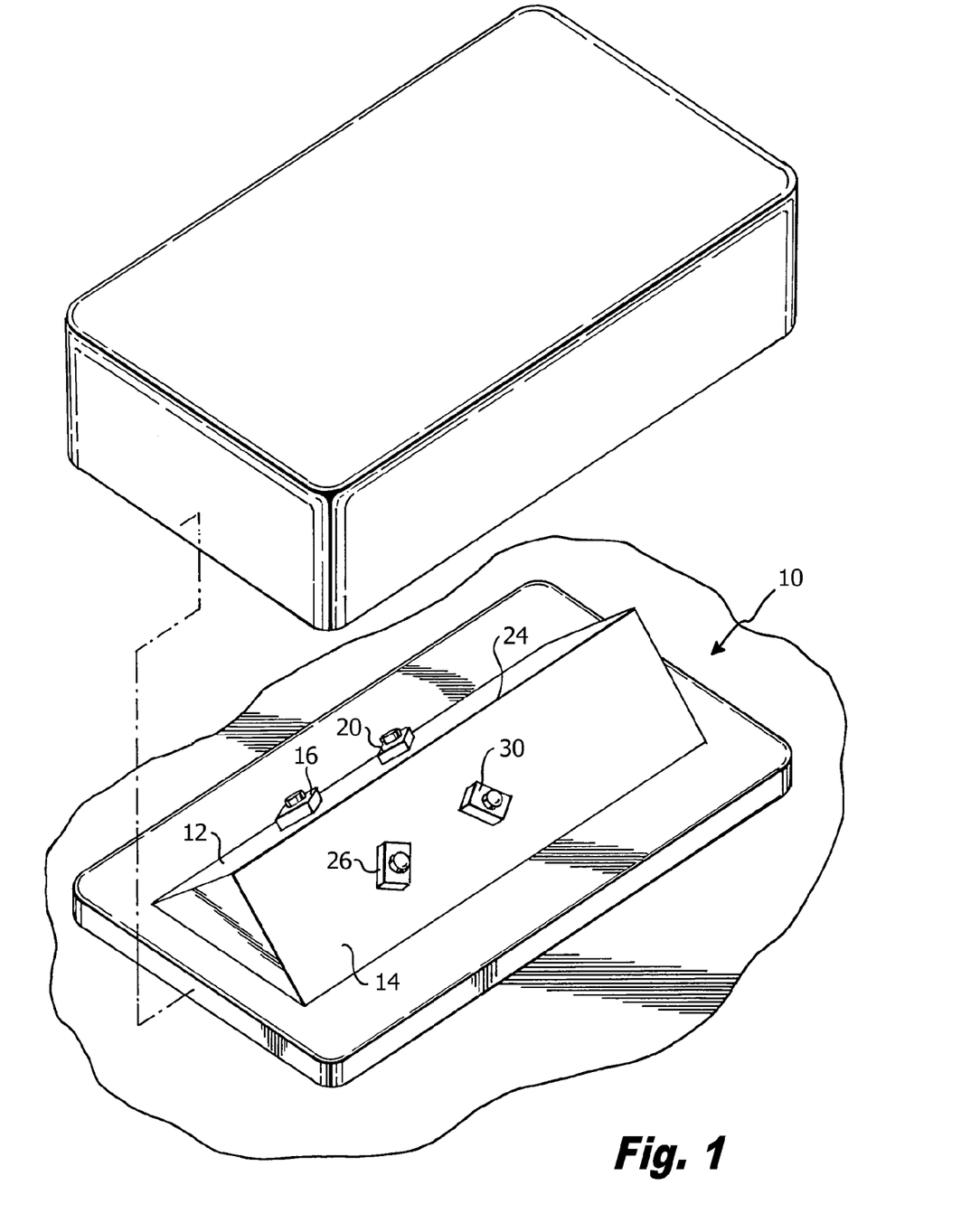
FIG. 1 is a perspective view of an inertial measurement unit constructed in accordance with the present invention, showing four in-plane sensors mounted on two perpendicular surfaces as well as an exploded view of a housing that may enclose the two perpendicular surfaces.
Figure 2:
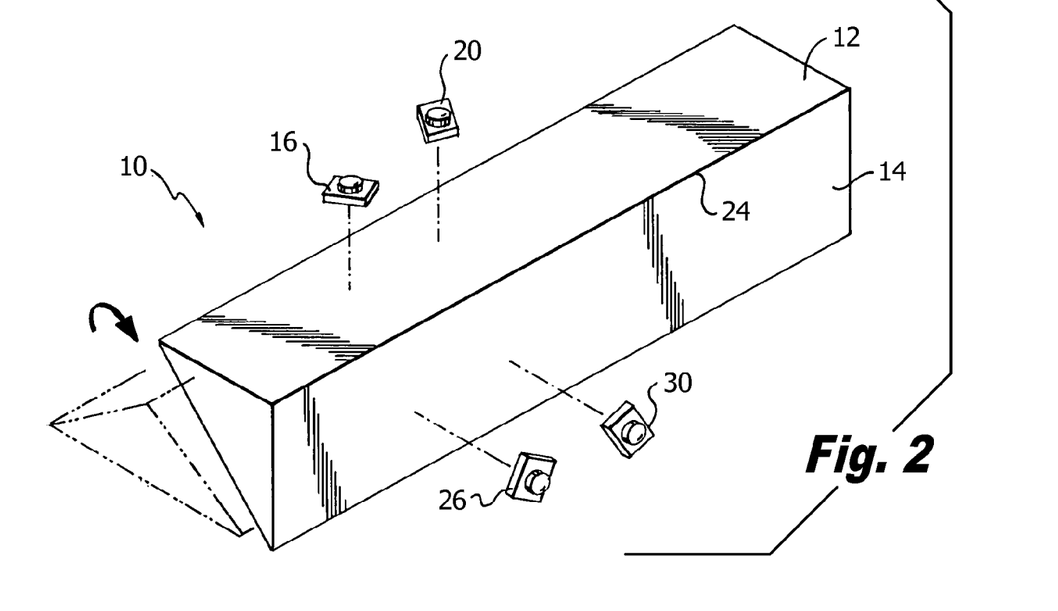
FIG. 2 is an exploded view of the inertial measurement unit of FIG. 1, rotated slightly to better show the two perpendicular surfaces.
Figure 3:
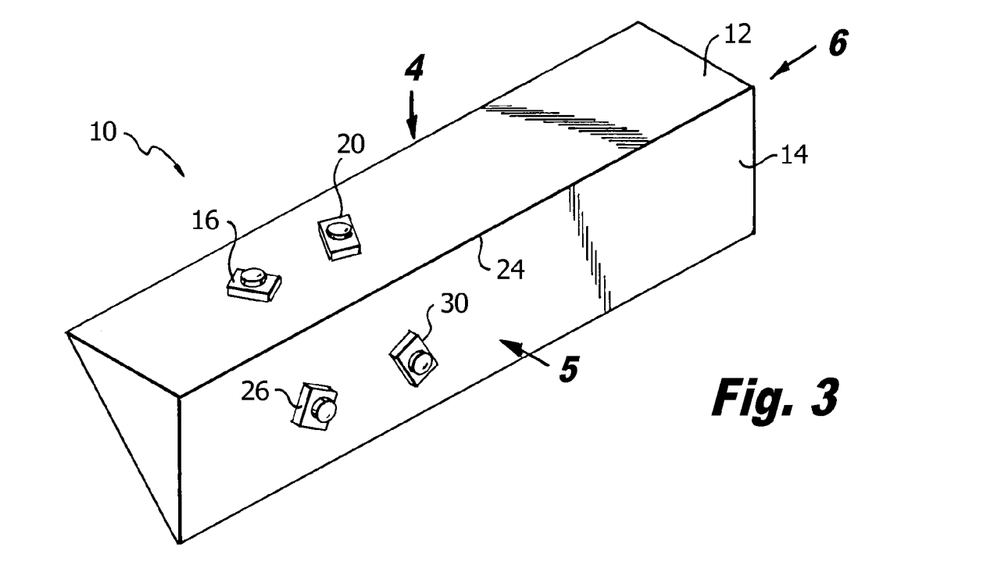
FIG. 3 is a perspective view an inertial measurement unit constructed in accordance with a first exemplary embodiment of the present invention, showing four in-plane sensors mounted on two planar surfaces that are perpendicular to one another.

For purposes of explanation and illustration, and not limitation, a first exemplary embodiment of the inertial measurement unit is shown in FIGS. 1-6 and is designated generally by reference character 10. FIG. 1 shows an exploded view of a removable housing that may be placed over inertial measurement unit 10. FIG. 2 shows a rotated and exploded view of the two perpendicular surfaces of inertial measurement unit 10.

Referring to FIGS. 3-6, an exemplary embodiment of inertial measurement unit 10 having four in-plane sensors in a tetrahedral configuration is shown. In this exemplary embodiment, inertial measurement unit 10 includes a first planar surface 12 and a second planar surface 14. First planar surface 12 is orthogonal to second planar surface 14, that is, the angle between first planar surface 12 and second planar surface 14 is approximately 90°. The structure of inertial measurement unit 10 may include additional surfaces and other elements. Inertial measurement unit 10 may include additional planar surfaces at a variety of orientations. For example, inertial measurement unit 10 may be a cube structure having additional planar surfaces that are parallel to either first planar surface 12 or second planar surface 14. However, only two perpendicular planar surfaces are required to construct inertial measurement unit 10 having a tetrahedral configuration.

As shown in FIGS. 3-6, inertial measurement unit 10 may include four in-plane sensors mounted on the two orthogonal planar surfaces. The in-plane sensors may include one or more microelectromechanical systems (MEMS) sensors, such a MEMS gyroscopic rotational rate sensor or a MEMS linear accelerometer. A first sensor 16 is mounted to first planar surface 12 and has a first sense axis 18 that is parallel to first planar surface 12. A second sensor 20 is also mounted to first planar surface 12 and has a second sense axis 22 that is parallel to first planar surface 12. First sense axis 18 and second sense axis 22 are positioned approximately 54.735 degrees from a linear junction or line 24 intersecting first planar surface 12 and second planar surface 14.

Figure 4:
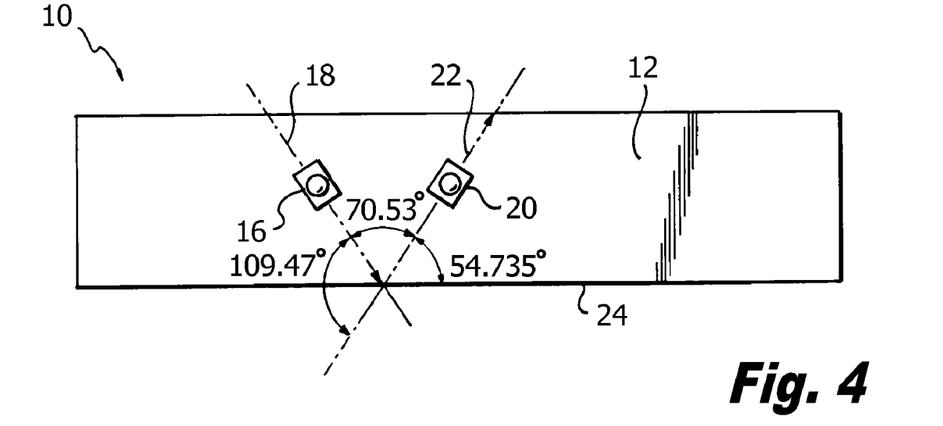
FIG. 4 is side view of the inertial measurement unit of FIG. 3, showing a first planar surface of the inertial measurement unit, the line of sight being perpendicular to the first planar surface, as shown by reference numeral 4 in FIG. 3.

Mounting first sensor 16 and second sensor 20 on first planar surface 12 such that their respective sense axes 18, 22 are both oriented at 54.735 degrees from intersection line 24 creates the supplementary angles of 109.47 and 70.53 degrees between sense axes 18 and 22, as illustrated in FIG. 4. That is, the outer or obtuse angle formed between sense axes 18 and 22 is approximately 109.47 degrees and the inner or acute angle formed between sense axes 18 and 22 is approximately 70.53 degrees.

Figure 5:
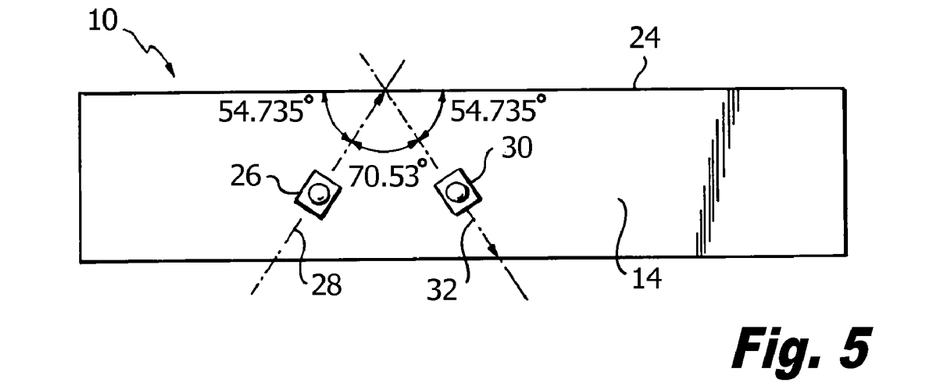
FIG. 5 is a side view of the inertial measurement unit of FIG. 3 showing a second planar surface of the inertial measurement unit, the line of sight being perpendicular to the second planar surface, as shown by reference numeral 5 in FIG. 3.
Figure 6:
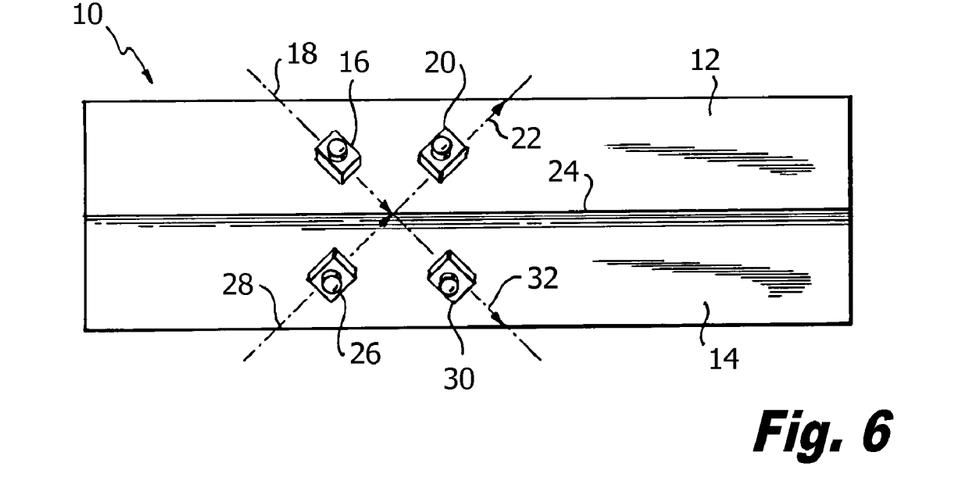
FIG. 6 is a top view of the inertial measurement unit of FIG. 3 showing both the first and second planar surfaces of the inertial measurement unit, the line of sight being shown by reference numeral 6 in FIG. 3.

A third sensor 26 is mounted on second planar surface 14 and has a third sense axis 28 that is parallel to the second planar surface 14. A fourth sensor 30 is also mounted to second planar surface 14 and has a fourth sense axis 32 that is parallel to second planar surface 14. Third sensor 26 and fourth sensor 30 are mounted on second plane 14 such that their respective sense axes 28, 32 are oriented at an angle of 54.735 degrees from intersection line 24, which creates the supplementary angles of 109.47 and 70.53 degrees between sense axes 28 and 32, as shown in FIG. 5.

Mounting sensors 16, 20, 26, 32 in this manner forms the supplementary angles of 109.47 and 70.53 degrees between each of the sense axes 18, 22, 28, 32. That is, first sense axis 18 is oriented at an angle of 70.53 degrees with respect to not only second sense axis 22, but also with respect to third sense axis 28 and fourth sense axis 32.

Mounting sensors 16, 20, 26, 32 in the configuration described above simplifies the fabrication and assembly of inertial measurement unit 10 by requiring only two surfaces for mounting the sensors. Consequently, inertial measurement unit 10 can be manufactured more efficiently and at a lower cost that prior art inertial measurement units.

For purposes of explanation and illustration, and not limitation, a second exemplary embodiment of the inertial measurement unit is shown in FIGS. 7-11 and is designated generally by reference character 40.

Figure 7:
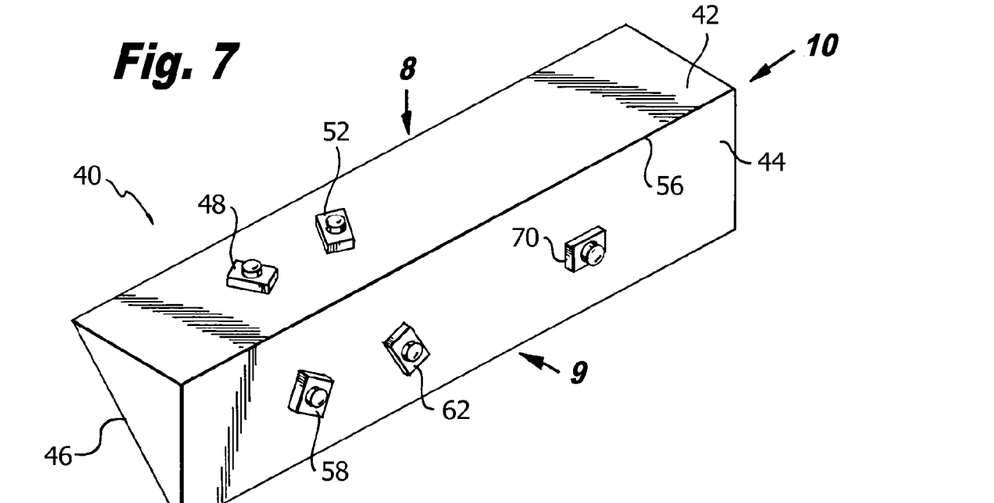
FIG. 7 is a perspective view an inertial measurement unit constructed in accordance with a second exemplary embodiment of the present invention, in which six in-plane sensors are mounted on three planar surfaces.
Figure 8:
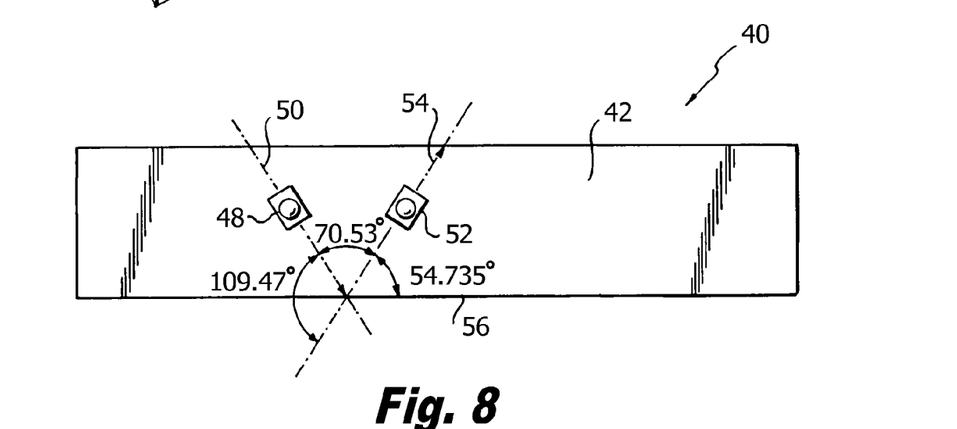
FIG. 8 is a side view of the inertial measurement unit of FIG. 7, showing a first and a second in-plane sensor mounted on a first planar surface of the inertial measurement unit, the line of sight being perpendicular to the first planar surface, as shown by reference numeral 8 in FIG. 7.
Figure 9:
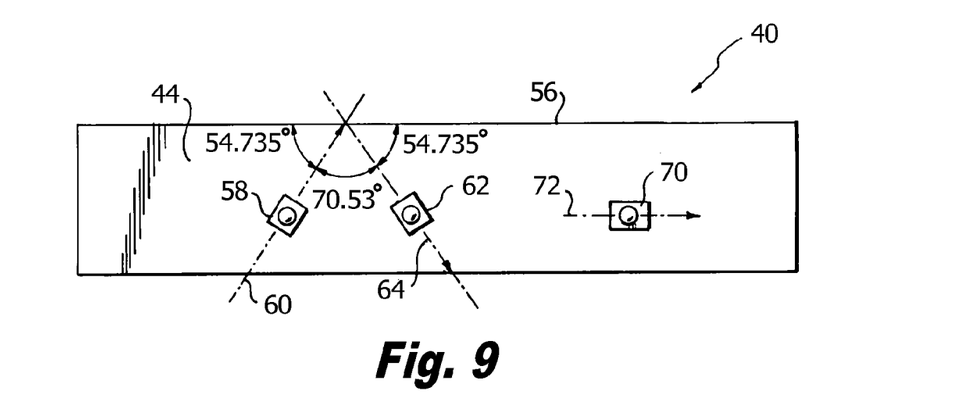
FIG. 9 is a side view of the inertial measurement unit of FIG. 7 showing a third, fourth, and fifth in-plane sensor mounted on a second planar surface of the inertial measurement unit, the line of sight being perpendicular to the second planar surface, as shown by reference numeral 9 in FIG. 7.
Figure 10:
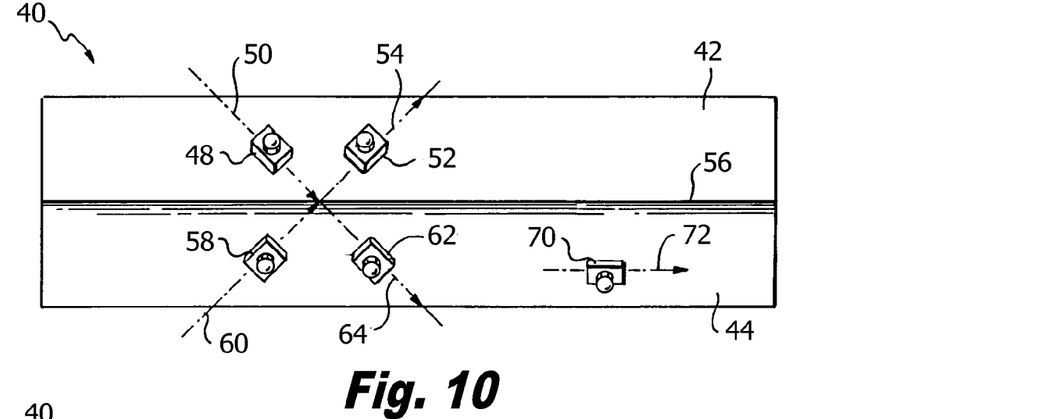
FIG. 10 is a top view of the inertial measurement unit of FIG. 7 showing both the first and second planar surfaces of the inertial measurement unit, the line of sight being shown by reference numeral 10 in FIG. 7.

In this exemplary embodiment, as shown in FIG. 7, inertial measurement unit 40 includes a first planar surface 42, a second planar surface 44, and a third planar surface 46. First planar surface 42 is orthogonal to second planar surface 44. In other words, the angle between first planar surface 42 and second planar surface 44 is approximately 90°. Third planar surface 46 is oriented at approximately 45° with respect to both first planar surface 42 and second planar surface 44. The structure of inertial measurement unit 40 may include other surfaces and elements as well.

As shown in FIGS. 7-11, inertial measurement unit 40 may include six in-plane sensors mounted on the three planar surfaces, with two of the surfaces mounted at a 90° with respect to each other, and one planar surface mounted at a 45° with respect to each of the other planar surfaces. The in-plane sensors may include one or more MEMS sensors, such a MEMS gyroscopic rotational rate sensor or a MEMS linear accelerometer. A first sensor 48 is mounted on first planar surface 42 in such a way that a first sense axis 50 of first sensor 48 is parallel to first planar surface 42. A second sensor 52 is oriented in such a way that a second sense axis 54 of sensor 52 is also parallel to first planar surface 42. First sense axis 50 and second sense axis 54 are each positioned approximately 54.735 degrees from the line 56 intersecting first planar surface 42 and second planar surface 44.

Mounting first sensor 48 and second sensor 52 on first planar surface 42 such that their respective sense axes 50, 54 are both oriented at 54.735 degrees from intersection line 56 creates the supplementary angles of 109.47 and 70.53 degrees between sense axes 50 and 54. That is, the outer or obtuse angle formed between sense axes 50 and 54 is approximately 109.47 degrees and the inner or acute angle formed between sense axes 50 and 54 is approximately 70.53 degrees.

A third sensor 58 having a third sense axis 60 is mounted on second planar surface 44 such that third sense axis 60 is parallel to second planar surface 44. A fourth sensor 62 having a fourth sense axis 64 is also mounted to second planar surface 44 such that fourth sense axis 64 is parallel to second planar surface 44. Third sense axis 60 and fourth sense axis 64 are also oriented at an angle of approximately 54.735° with respect to the line 56 intersecting first planar surface 42 and second planar surface 44. Third sensor 58 and fourth sensor 62 are mounted on second plane 44 such that their respective sense axes 60, 64 are oriented at an angle of approximately 54.735 degrees from intersection line 56, which creates the supplementary angles of 109.47 and 70.53 degrees between sense axes 60 and 64.

Figure 11:
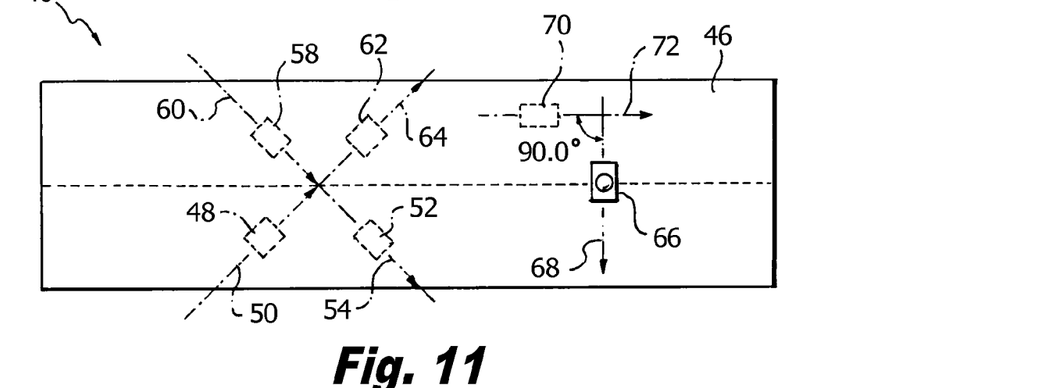
FIG. 11 is a bottom view of the inertial measurement unit of FIG. 7, showing a sixth sensor mounted on the third planar surface and showing the remaining four sensors in phantom.

A fifth sensor 66 having a fifth sense axis 68 is mounted to third planar surface 46 and oriented such that fifth sense axis 68 is parallel to second planar surface 46. A sixth sensor 70 having a sixth sense axis 72 may also be mounted to any one of the first, second, or third planar surfaces 42, 44, or 46. In the exemplary embodiment shown in FIGS. 7-11, sixth sensor 70 is mounted to second planar surface 44. Sixth sensor 70 is mounted in such a way that sixth sense axis 72 is oriented at approximately 90° with respect to fifth sense axis 68. For example, in the exemplary embodiment shown, sixth sensor 70 is oriented such that the projection of fifth sense axis 68 onto third planar surface 46 forms a 90° angle with sixth sense axis 72, as shown in FIG. 11.

Advantageously, two planar surfaces mounted at an angle of 90° with respect to one another can also be used form an inertial measurement unit having a non-redundant orthogonal alignment of three planar sensors, in addition to forming a tetrahedral configuration using four planar sensors.

For purposes of explanation and illustration, and not limitation, a third exemplary embodiment of the inertial measurement unit is shown in FIGS. 12-15 and is designated generally by reference character 80.

Figure 12:
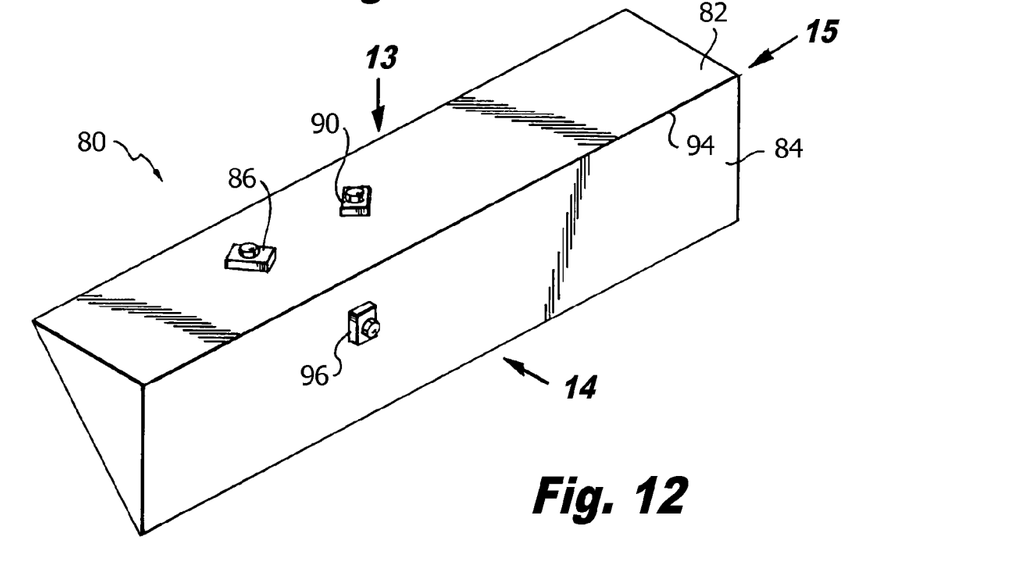
FIG. 12 is a perspective view of a third exemplary embodiment of an inertial measurement unit according to the present invention, showing three in-plane sensors mounted on two planar surfaces.
Figure 13:
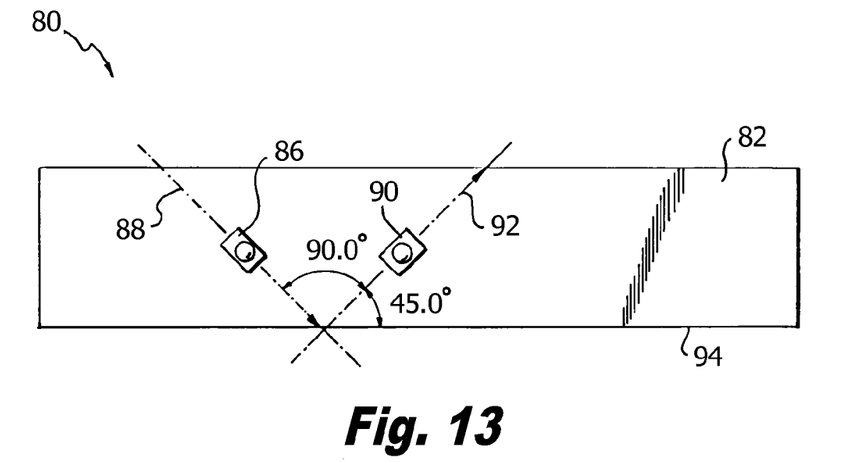
FIG. 13 is a side view of the inertial measurement unit of FIG. 12, showing a first and a second in-plane sensor mounted on a first planar surface, the line of sight being shown by reference numeral 13 on FIG. 12.
Figure 14:
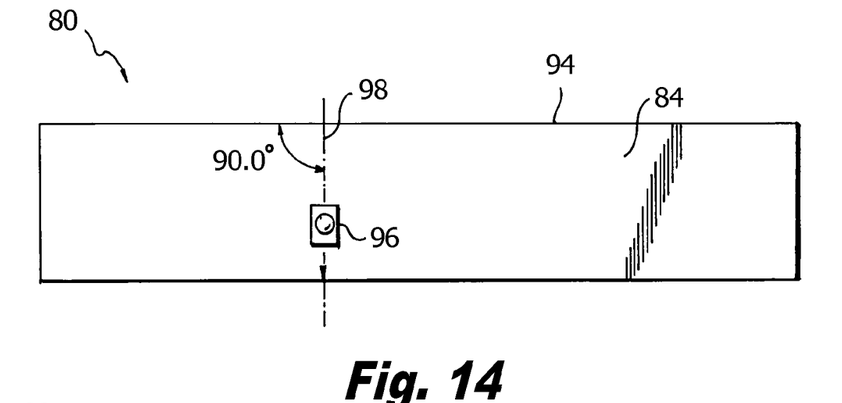
FIG. 14 is a side view of the inertial measurement unit of FIG. 12, showing a third in-plane sensor mounted on a second planar surface, the line of sight being shown by reference numeral 14 on FIG. 12.
Figure 15:
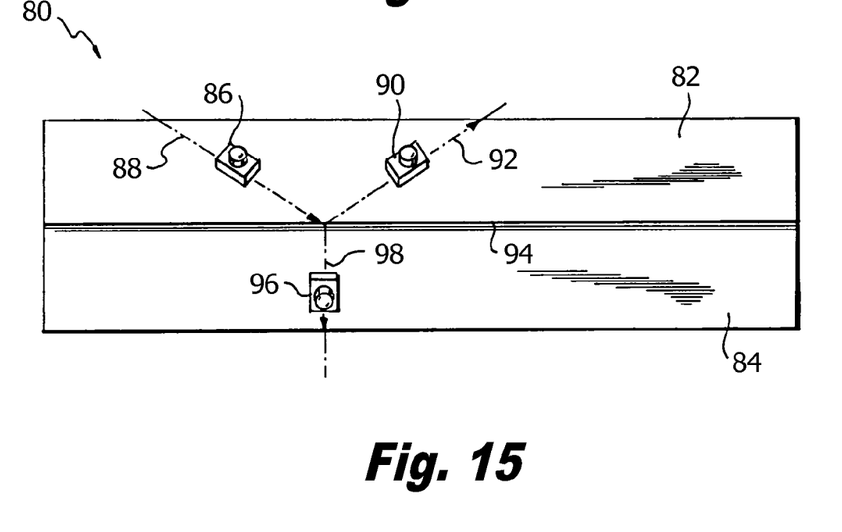
FIG. 15 is a top view of the inertial measurement unit of FIG. 12, showing both the s first and second planar surfaces of the inertial measurement unit, the line of sight being shown by reference numeral 15 in FIG. 12.

Inertial measurement unit 80 includes a first planar surface 82 and a second planar surface 84. First planar surface 82 and second planar surface 84 are orthogonal to one another, that is first planar surface 82 and second planar surface 84 are oriented at an angle of approximately 90° with respect to one another. A first sensor 86 having a first sense axis 88 is mounted on first planar surface 82 such that first sense axis 88 is parallel to first planar surface 82. A second sensor 90 having a second sense axis 92 is also mounted to first planar surface 82 such that second sense axis 92 is parallel to first planar surface 82. A perspective view of inertial measurement unit 80 is shown in FIG. 12.

First sensor 86 and second sensor 90 are mounted on first planar surface 82 such that first sense axis 88 and second sense axis 92 are each oriented at an angle of approximately 45° with respect to a line 94 intersecting first planar surface 82 and second planar surface 84. Mounting first sensor 86 and second sensor 90 in this manner creates an angle of approximately 90° between the two sense axes 88 and 92. A third sensor 96 having a third sense axis 98 is mounted on second planar surface 84 at an angle of approximately 90° with respect to the intersection line 94.

The above configuration allows inertial measurement unit 80 to provide a non-redundant orthogonal alignment of three planar sensors on only two surfaces. First sense axis 88, second sense axis 92, and third sense axis 98 are mutually orthogonal.

As with the first exemplary embodiment, mounting sensors 86, 90, and 96 in the configuration described above simplifies the fabrication and assembly of inertial measurement unit 80.

The inertial measurement unit of the present invention, as described above and shown in the drawings, is a device that requires only two surfaces for mounting MEMS sensors such as accelerometers and gyroscopes. This configuration allows the inertial measurement unit to be manufactured more efficiently and at a lower cost that prior art inertial measurement units. It also requires less space than prior art designs. It will be apparent to those skilled in the art that various modifications and variations can be made to the device of the present invention and to the methods of making the device without departing from the scope of the invention as described in the appended claims and their equivalents.

The invention claimed is:

1. A method of mounting in-plane sensors, comprising the steps of:
   providing a structure having first and second planar surfaces oriented orthogonally to one another;
   positioning at least two sensors on the first planar surface such that each of the sensors has a sense axis extending parallel to the first planar surface;
   positioning at least two other sensors on the second planar surface such that the at least two other sensors each has a sense axis extending parallel to the second planar surface; and
   orienting the sensors on the first and second surfaces so that the angles formed between any two sense axes are equal.

2. The method of claim 1, wherein the step of orienting the sensors includes orienting the sensors such that any two sense axes are oriented at an outer angle of 109.47 degrees relative to one another.

3. The method of claim 1, further comprising the step of providing a third planar surface on the structure, oriented at an angle of 45 degrees with respect to both the first planar surface and the second planar surface.

4. The method of claim 3, further comprising the step of positioning a first redundant sensor on the third planar surface such that a sense axis of the first redundant sensor is parallel to the third planar surface.

5. The method of claim 4, further comprising the step of mounting a second redundant sensor on any one of the first, second, and third planar surfaces such that a sense axis of the second redundant sensor is parallel to both the second planar surface and the first planar surface, and is perpendicular to the sense axis of the first redundant sensor.

6. An inertial measurement unit, comprising:
   a structure having a first planar surface and a second planar surface oriented orthogonally to one another;
   at least two primary sensors mounted on the first planar surface, wherein each of the primary sensors has a sense axis that extends parallel to the first planar surface; and
   at least two primary sensors mounted on the second planar surface, wherein the each primary sensor mounted on the second planar surface has a sense axis that is parallel to the second planar surface, and wherein the outer angle formed between any two sense axes is equal to approximately 109.47 degrees.

7. The inertial measurement unit of claim 6, further comprising a redundant sensor mounted on the first planar surface, the redundant sensor having a sense axis with an identical orientation to one of the primary sensors mounted on the first planar surface.

8. The inertial measurement unit of claim 6, wherein the structure is a triangular prism including a third planar surface connecting the first planar surface and the second planar surface, wherein the third planar surface is oriented at an angle of 45 degrees with respect to both the first and second planar surface.

9. The inertial measurement unit of claim 6, wherein the primary sensors are accelerometers.

10. The inertial measurement unit of claim 6, wherein the primary sensors are gyroscopic rotational rate sensors.

11. A method for providing a tetrahedral angle configuration for a three-axis inertial measurement unit on two mounting surfaces, the method comprising:
provided a structure having a first planar surface and a second planar surface oriented orthogonally to one another, and a linear junction formed at the intersection of the first and second planar surfaces;
mounting a first sensor on the first planar surface such that a sense axis of the first sensor is parallel to the first planar surface and oriented at an inner angle of approximately 54.74 degrees from the linear junction;
mounting a second sensor on the first planar surface such that a sense axis of the second sensor is parallel to the first planar surface and oriented at an inner angle of approximately 54.74 degrees from the linear junction;
mounting a third sensor on the second planar surface such that a sense axis of the third sensor is parallel to the second planar surface and is oriented at an inner angle of approximately 54.74 degrees from the linear junction; and
mounting a fourth sensor on the second planar surface such that a sense axis of the fourth sensor is parallel to the second planar surface and is oriented at an inner angle of approximately 54.74 degrees from the linear junction.

12. The method of claim 11, further comprising mounting an additional redundant sensor on any one of the first planar surface and the second planar surface.

* * * * *